United States Patent
Anneheim et al.

(10) Patent No.: US 10,909,706 B1
(45) Date of Patent: Feb. 2, 2021

(54) ROBUST HARDWARE EFFICIENT DISPARITY ESTIMATION USING TOTAL-VARIATION L1 REGULARIZATION

(71) Applicant: Apple Inc., Cupertino, CA (US)

(72) Inventors: Geoffrey T. Anneheim, San Francisco, CA (US); Bruno J. Conejo, Portland, OR (US); Stephane S. Ben Soussan, San Francisco, CA (US); Michael W. Tao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 15/996,363

(22) Filed: Jun. 1, 2018

Related U.S. Application Data

(60) Provisional application No. 62/514,446, filed on Jun. 2, 2017.

(51) Int. Cl.
| | | |
|---|---|---|
| G06K 9/68 | (2006.01) | |
| G06T 7/593 | (2017.01) | |
| G06T 3/00 | (2006.01) | |
| G06T 5/00 | (2006.01) | |
| G06T 7/90 | (2017.01) | |
| G06T 7/70 | (2017.01) | |
| G06T 7/13 | (2017.01) | |
| G06K 9/62 | (2006.01) | |

(52) U.S. Cl.
CPC ............ *G06T 7/593* (2017.01); *G06K 9/6202* (2013.01); *G06T 3/0093* (2013.01); *G06T 5/002* (2013.01); *G06T 7/13* (2017.01); *G06T 7/70* (2017.01); *G06T 7/90* (2017.01)

(58) Field of Classification Search
CPC ......... H04N 2013/0081; H04N 13/128; H04N 13/239; G06T 7/593; G06T 2207/10012
USPC ........ 382/218, 275, 104, 162, 107; 348/164, 348/46
See application file for complete search history.

(56) References Cited

U.S. PATENT DOCUMENTS

| | | | |
|---|---|---|---|
| 4,737,850 | A | 4/1988 | Lu |
| 5,404,179 | A | 4/1995 | Hamasaki |
| 5,533,149 | A | 7/1996 | Kaplan |
| 5,604,856 | A | 2/1997 | Guenter |
| 9,354,490 | B2 * | 5/2016 | Fergus .................. G03B 15/03 |
| 9,565,416 | B1 | 2/2017 | Lewkow |
| 9,692,959 | B2 | 6/2017 | Yoon |
| 9,736,451 | B1 * | 8/2017 | Barron ................. H04N 13/128 |
| 9,978,154 | B2 | 5/2018 | Hsu |

(Continued)

OTHER PUBLICATIONS

"Middlebury Optical Flow evaluation," Retrieved from the Internet: URL: http://vision.middlebury.edu/flow/ [retrieved on Jun. 1, 2018].

(Continued)

*Primary Examiner* — Charlotte M Baker
(74) *Attorney, Agent, or Firm* — Blank Rome LLP

(57) ABSTRACT

Determining disparity includes obtaining a first image of a scene and a second image of a scene, determining correspondences between one or more pixels of the first image and one or more pixels of the second image, performing local denoising on the correspondences based on at least on a strength and direction of gradient values for the one or more pixels of the first image and the one or more pixels of the second image, and generating a disparity map based on the determined correspondences and local denoising.

20 Claims, 7 Drawing Sheets

(56) References Cited

U.S. PATENT DOCUMENTS

2014/0184747 A1* 7/2014 Valente ............... H04N 13/296
348/46
2015/0264337 A1 9/2015 Venkataraman

OTHER PUBLICATIONS

"MPI Sintel Flow Dataset," Retrieved from the Internet: URL: http://sintel.is.tue.mpg.de [retrieved on Jun. 1, 2018].
"The KITTI Vision Benchmark Suite," Retrieved from the Internet: URL: http://www.cvlibs.net/datasets/kitti/ [retrieved pn Jun. 1, 2018].
"Week 5: The image gradient," http://www.cs.toronto.edu/'mangas/teaching/320/slides/CSC320L05.pdf, Toronto University.
Chambolle, A. and Pock, T., "A First-Order Primal-Dual Algorithm for Convex Problems with Applications to Imaging," Journal of Mathematical Imaging and Vision, 40(1):120-145, 2010.
Chambolle, A., Caselles, V., Novaga, M., Cremers, D., and Pock, T., "An Introduction to Total Variation for Image Analysis," Radon Series on Computational and Applied Mathematics, Walter de Gruyter, 2010.
Horn, B. K. P. & Schunck, B. G., "Determining Optical Flow," Artificial Intelligence 17, 185-203, 1981.
Huber, P. J., "Robust Regression: Asymptotics, Conjectures and Monte Carlo," The Annals of Statistics, 1(5):799-821, 1973.
J. Carter, "Dual Methods for Total Variation-based Image Restoration," PhD thesis, UCLA, Los Angeles, CA, 2001.
L. I. Rudin, S. Osher, and E. Fatemi, "Nonlinear total variation based noise removal algorithms," Physica D, 60:259-268, 1992.
M. Werlberger, "Convex Approaches for High Performance Video Processing," PhD Thesis, 2012.
M. Werlberger, T. Pock, H. Bischof, "Motion Estimation with Non-Local Total Variation Regularization," IEEE Computer Society Conference on Computer Vision and Pattern Recognition (CVPR), 2010.
M. Werlberger, W. Trobin, T. Pock, A. Wedel, D. Cremers, H. Bischof, "Anisotropic Huber-L1 Optical Flow," Machine Vision Conference (BMVC), London, UK, Sep. 2009.
Nagel, H.-H., "Constraints for the Estimation of Displacement Vector Fields From Image Sequences," In Proceedings to the Eighth international joint conference on Artificial intelligence, vol. 2, pp. 945-951, 1983.
T. Brox, A. Bruhn, N. Papenberg, and J. Weickert, "High accuracy optical flow estimation based on a theory for warping," In European Conference on Computer Vision (ECCV), pp. 25-36, 2004.
T. Chan, G. Golub, and P. Mulet, "A nonlinear primal-dual method for total variation-based image restoration," SIAM J. Sci. Comp., 20(6):1964-1977, 1999.
Xu, L., Jia,, J. & Matsushita, Y., "Motion detail preserving optical flow estimation," in Computer Vision and Pattern Recognition (CVPR), 2010 IEEE Conference on, pp. 1293-1300, 2010.
Zach, C. Pock, T. & Bischof, H., "A duality based approach for real-time TV-L1 optical flow," in F. Hamprecht, C. Schnorr & B. Jahne, eds, Pattern Recognition, vol. 4713 of Lecture Notes in Computer Science, Springer, pp. 214-223.

* cited by examiner

ROBUST HARDWARE EFFICIENT DISPARITY ESTIMATION USING TOTAL-VARIATION L1 REGULARIZATION

BACKGROUND

This disclosure relates generally to the field of digital image processing, and, more particularly, to the field of robust hardware efficient disparity estimation using total-variation L1 regularization.

Disparity refers to the different location of a particular pixel or object between two images. For example, cameras at two different locations will capture objects in a scene differently. Disparity maps may represent the difference between the two images for each pixel in the images. Disparity maps may be utilized to determine the depth of a scene. For example, a large disparity indicates that an object is closer to the camera positions from which the two images were taken. A smaller disparity indicates a corresponding object is farther away. The process of calculating disparity generally begins by obtaining two images from different viewpoints. For example, the images may be captured by two cameras at different viewpoints, or by a single camera at two different viewpoints. Determining disparity generally includes finding correspondences between two images and determining a magnitude of disparity between the correspondences. Today, the variational global approach to optical flow is a common method for determining disparity.

Difficulties in determining depth may arise when disparity is not easily calculated. For example, miscalibration between two cameras can result in noise, and illumination changes can affect disparity calculations. There may be inherent limitations in the sensors. Further, there may be limitations in the scene that make determining disparity difficult. Large movements of objects, objects that are very close to either of the cameras, and occlusions of objects in the scene may make determining disparity a challenge.

SUMMARY

In one embodiment, a method for determining disparity is described. The method may include obtaining a first image of a scene and a second image of a scene, determining correspondences between one or more pixels of the first image and one or more pixels of the second image, perform local denoising on the correspondences based on at least on a strength and direction of gradient values for the one or more pixels of the first image and the one or more pixels of the second image, and generating a disparity map based on the determined correspondences and local denoising.

In another embodiment, the various methods may be embodied in computer executable program code and stored in a non-transitory storage device. In yet another embodiment, the method may be implemented in an electronic device.

DETAILED DESCRIPTION

Figure 1:
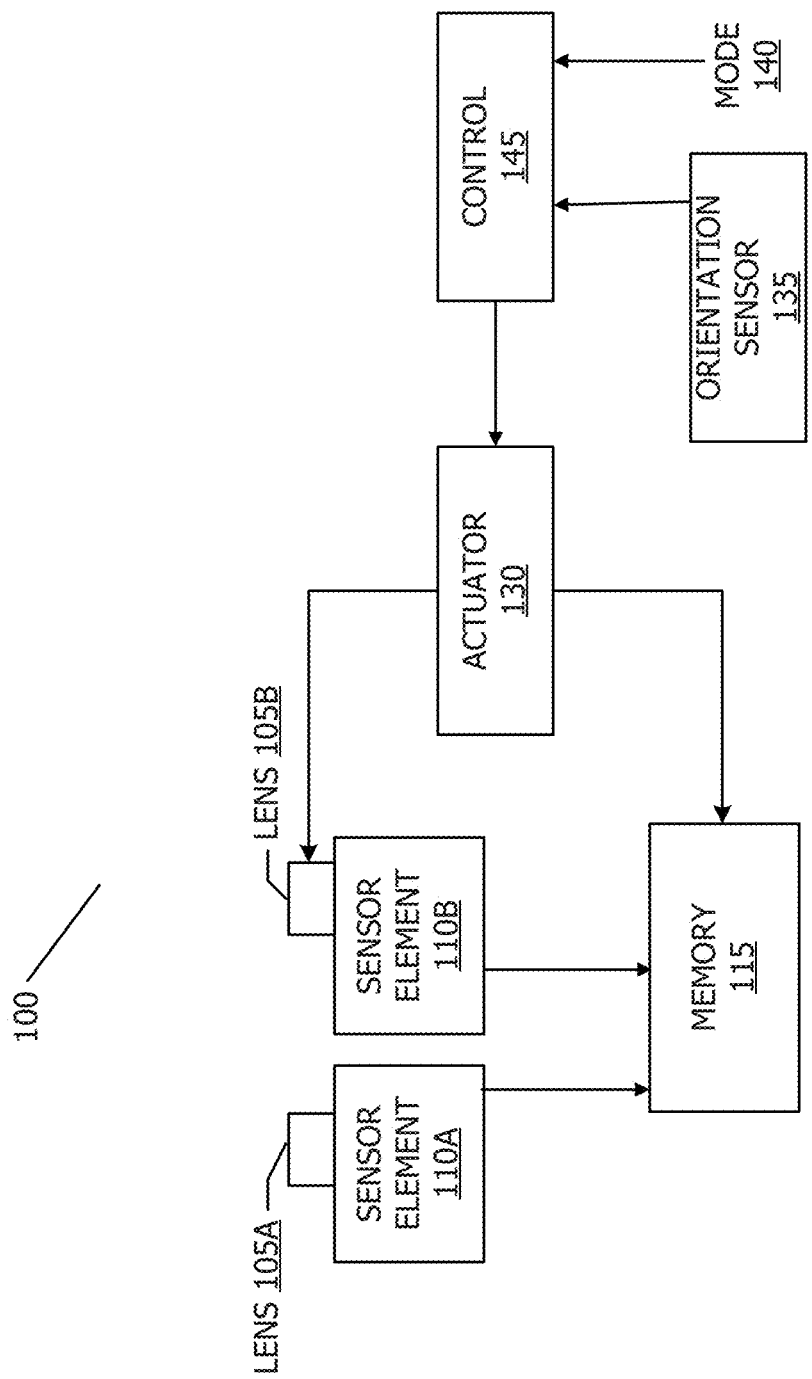
FIG. 1 shows, in block diagram form, a simplified image capture device according to one or more embodiments.

This disclosure pertains to systems, methods, and computer readable media for determining disparity. In general, techniques are disclosed for utilizing two images captured from different camera poses in a disparity estimation pipeline that is robust against real world capturing scenarios. For example, embodiments are robust against camera miscalibration between two cameras, noise, illumination changes, other sensor limitations, and scene scenarios, such as a large displacement or occlusions. In one or more embodiments, the pipeline uses a pyramidal approach, where lower resolutions of the images are generated to address large displacements. For each pyramid level, there may be three stages of processing, including a total variation (TV-L1) framework that addresses matching of the pixels and local denoising. A second stage may include edge-aware filtering that addresses non-local de-noising. The third stage may include occlusion handling. In one or more embodiments, the pipeline may be processed in a hardware-efficient manner.

According to one or more embodiments, the TV-L1 framework may be an example of a total variation denoising framework utilized to find correspondences and handle local de-noising. In one or more embodiments, the TV-L1 framework may include a data term and a regularization term. The data term may be utilized to compute local cost to find correspondences across two images. The regularization term may be utilized to de-noise the correspondences. The output of the TV-L1 framework may be utilized to generate a disparity map.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 105) refer to all instances of the drawing element with identifiers (e.g., 105A and 105B). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera" refers to a lens assembly, along with the sensor element and other circuitry utilized to capture an image. For purposes of this disclosure, two or more cameras may share a single sensor element and other circuitry, but include two different lens assemblies. However, in one or more embodiments, two or more cameras may include separate lens assemblies, as well as separate sensor elements and circuitry.

Referring to FIG. 1, a simplified block diagram of camera system 100 is depicted, in accordance with one or more embodiments of the disclosure. Camera system 100 may be part of a camera, such as a digital camera. Camera system 100 may also be part of a multifunctional device, such as a mobile phone, tablet computer, personal digital assistant, portable music/video player, or any other electronic device that includes a camera system.

Camera system 100 may include one or more lens systems 105. More specifically, as described above, lens systems 105A and 105B may actually each include a lens assembly, which may include a number of optical lenses, each with various lens characteristics. For example, each lens system 105 may include its own physical imperfections that affect the quality of an image captured by the particular lens system. When multiple lenses are combined, for example in the case of a compound lens, the various physical characteristics of the lenses may impact the characteristics of images captured through the lens assembly, such as focal points. In addition, each of lens systems 105A and 105B may have similar characteristics, or may have different characteristics, such as a different depth of field (DOF).

As depicted in FIG. 1, camera system 100 may also include sensor elements 110A and 110B. Sensor elements 110 may be sensors that detect and convey the information that constitutes an image. Light may flow through the corresponding lens system 105 prior to being detected by sensor element 110 and be stored, for example, in memory 115. In one or more embodiments, the camera system 100 may include multiple lens systems 105A and 105B, and each of the lens systems may be associated with a different sensor element, or one or more of the lens systems may share a sensor element 110.

Camera system 100 may also include an actuator 130, and mode select input 140. In one or more embodiments, actuator 130 may manage control of one or more of the lens assemblies 105. For example, the actuator 130 may control focus and aperture size. Orientation sensor 135 and mode select input 140 may supply input to control unit 145. In one embodiment, camera system may use a charged coupled device (or a complementary metal-oxide semiconductor as sensor element 110), an electro-mechanical unit (e.g., a voice coil motor) as actuator 130. Although FIG. 1 depicts two sensor/lens combinations associated with a single memory 115 and actuator 130, in one or more embodiments, each sensor/lens pair may be associated with a separate image capture circuitry.

Figure 2:
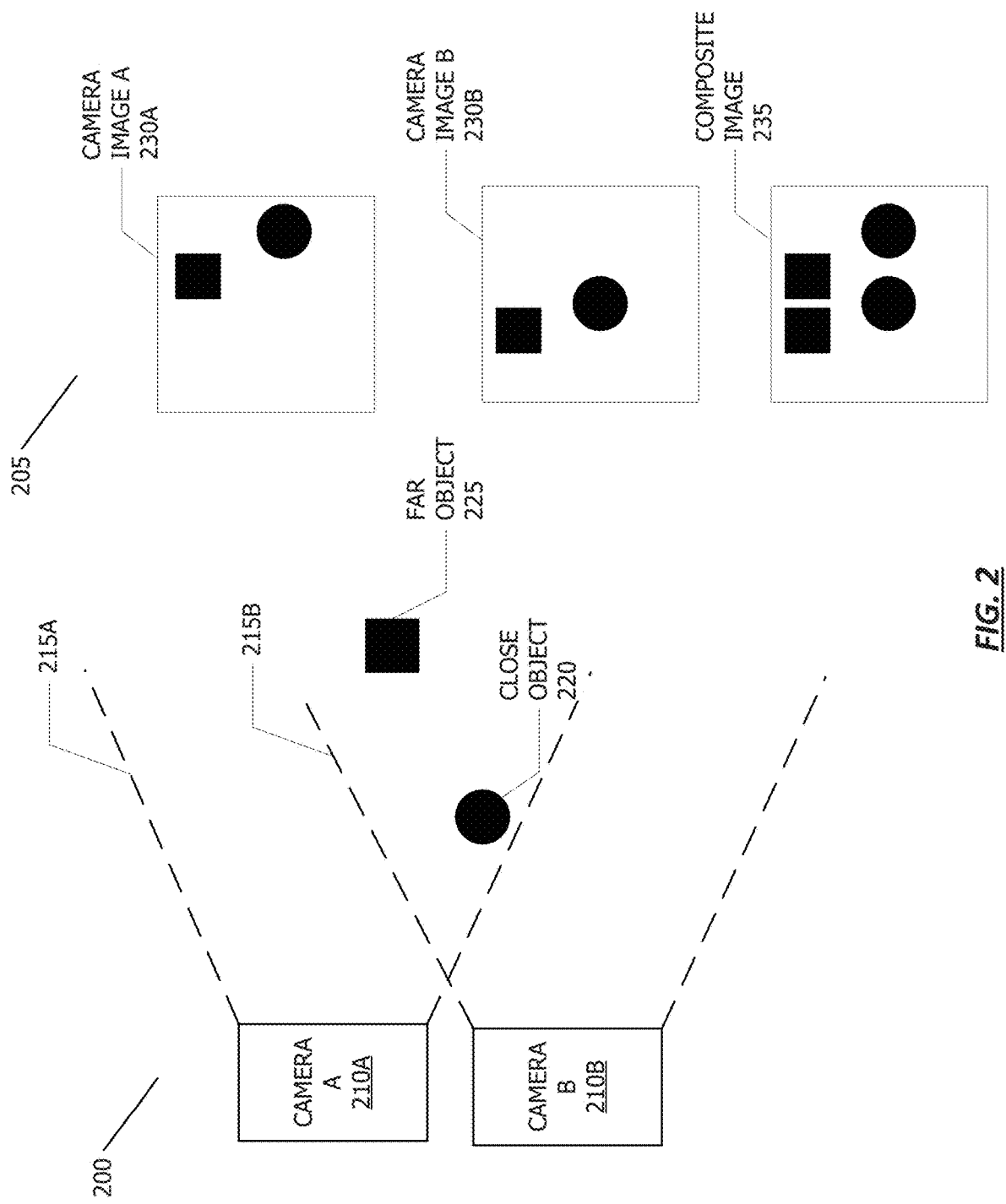
FIG. 2 shows, in block diagram form, an example a camera system for determining disparity in a scene, according to one or more embodiments.

FIG. 2 shows a block diagram depicting a top view of a camera setup 200 utilized to capture an image set for generating a disparity map. The camera setup 200 may include camera A 210A and camera B 210B. As described above, each of camera A 210A and camera B 210B may include a lens stack attached to a sensor and image capture circuitry utilized to capture an image of a real world environment. In one or more embodiments, the two cameras 210A and 210B may identify a single camera that captures images of the scene from two different camera poses. Each of camera A 210A and camera B 210B may have different characteristics, such as a different focal length, or other unique characteristics specific to the particular camera.

The camera setup 200 depicts two cameras (or, as described above, a camera capturing images from two different poses) capturing an images of a scene from different viewpoints. Thus, camera A 210A and camera B 210B each have a different field of view. As shown in the example camera setup 200, camera A 210A has a field of view of 215A and camera B 210B has a field of view of 215B. Camera A 210A and camera B 210B capture images of a real environment. For purposes of this example, the captured portion of the real environment may include objects in the real environment. As shown, the environment may include, for purposes of this example, the environment being captured by the cameras includes a close object 220 and a far object 225.

FIG. 2 additionally depicts a series of images 230 of the real world environment captured by the camera setup 200. Camera image A 230A depicts the field of view 215A from the image pose of camera A 210A. Similarly, camera image B 230B depicts the field of view 215B from camera B 210B. As shown, the close object 220 appears in a much different location in camera image A 230A and camera image B 230B. In contrast, far object 225 appears closer to the same position in camera image A 230A and camera image B 230B. Thus, the disparity corresponding to the close object 220 is greater than the disparity corresponding to the far object 225. The distinction is made clear when considering the composite image 235, which shows camera image A 230A overlaid with camera image B 230B. From this information, a disparity map may be generated, according to one or more embodiments. Specifically, in one or more embodiments, one of image A 230A and image B 230B will be selected as a reference image to which the remaining image will be compared to determine disparity.

Figure 3:
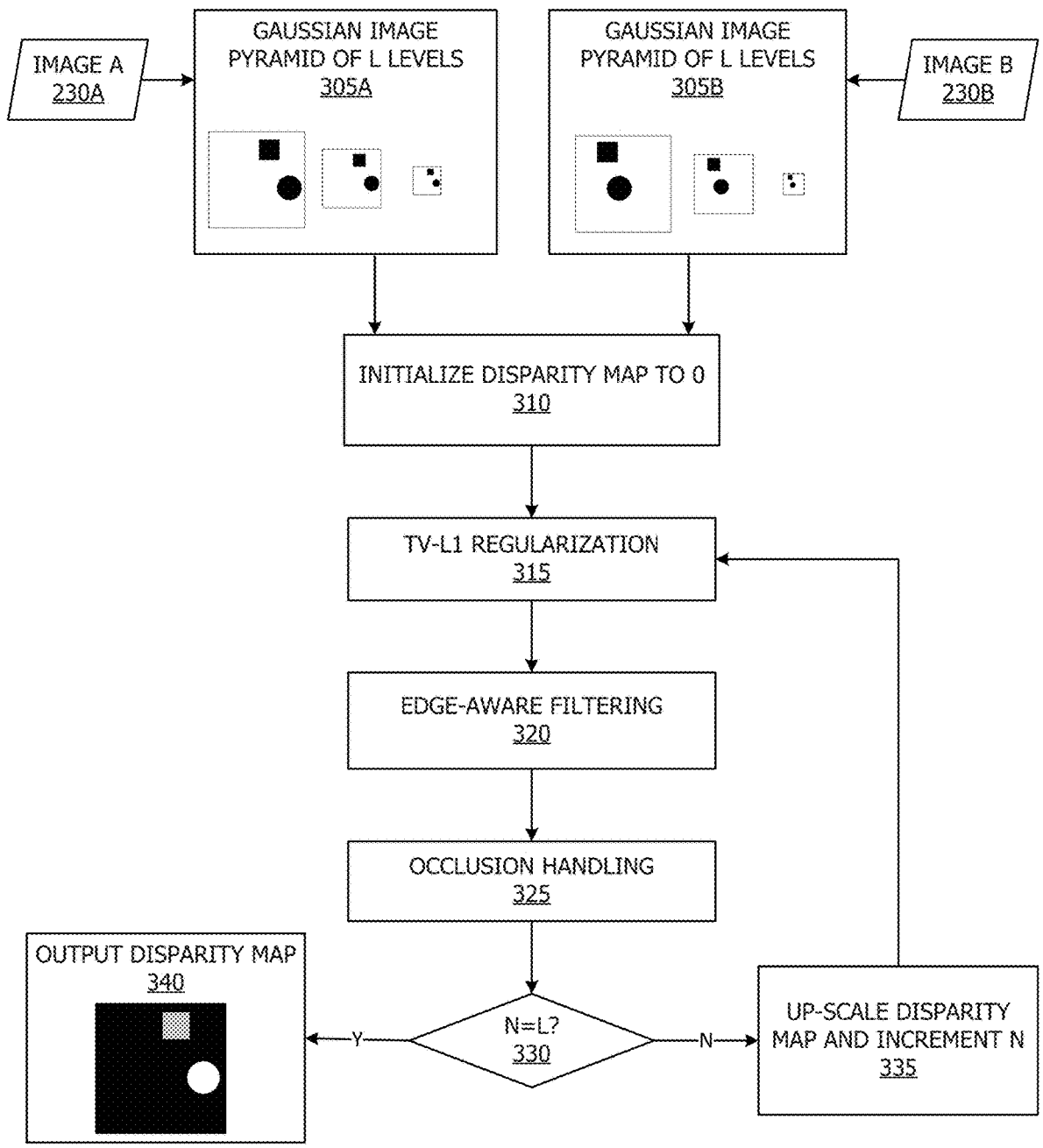
FIG. 3 shows, flow chart form, a method for determining a disparity map in accordance with one or more embodiments.

FIG. 3 shows, flow chart form, a method for determining a disparity map in accordance with one or more embodiments. For purposes of explanation, the flow chart depicted in FIG. 3 and the following description may refer to reference numbers from FIG. 1 and FIG. 2. However, it should be understood that any reference to a particular component is intended for clarity of explanation, and is not intended to limit the embodiments.

The flow chart begins at 305A, and image A 230A is received. A Gaussian image pyramid of a number of levels is determined. Similarly, at 305B, image B 230B is received, and the same number of levels for the Gaussian image pyramid is determined. For purposes of the example, the number of levels is referred to as "L." The number of levels of the image pyramid may be a predetermined number of levels. Further, according to one or more embodiments, the number of levels may be modified based on internal parameters, resource savings, or other reasons. For example, utilizing more levels may require more resources or take longer to process, but may result in a more accurate disparity map. Alternatively, utilizing fewer levels may require fewer resources or less processing time, but may result in a less accurate disparity map. In one or more embodiments, the Gaussian image pyramid may include a determined number of images (i.e., "L"), at various resolutions. According to one or more embodiments, determining disparity at a lower resolution may be advantageous for finding correspondences between close objects, where disparity is large. Likewise, determining disparity at a higher resolution may be advantageous for identifying correspondences between far objects, where disparity is small.

The flow chart continues at 310, and the disparity map is initialized to zero. For example, for each pixel in the disparity map, the value is set to zero to indicate that no disparity has been determined. In one or more embodiments, a counter may also be initialized to determine how many different resolution levels have been processed. Thus, the variable, such as N, may be initialized to 1 to indicate that the first resolution level of the Gaussian image pyramid is being utilized. At 315, the pipeline continues at the total variation L1 ("TV-L1") regularization phase. Various parts of the pipeline, beginning with the TV-L1 regularization phase at 315 initially utilizes a lowest resolution version of the images from the Gaussian image pyramid, according to one or more embodiments. In one or more embodiments, the TV-L1 regularization phase may be utilized to find correspondences between a reference image and a second image, selected from the particular level of resolution for image A 230A and image B 230B. In addition, the TV-L1 regularization phase 315 may be utilized to perform local de-noising to better determine disparity, according to one or more embodiments. The TV-L1 regularization phase 315 will be described in greater detail below with respect to FIG. 4 and FIG. 5.

The flow chart continues at 320 and edge-aware filtering is performed. In one or more embodiments, edge-aware filtering may include utilizing color information to identify boundaries. For example, pixels of similar colors may be considered to have similar depths, and thus similar disparity information. Thus, for example, areas of the background that are visible around a foreground item and partially occluded by the foreground item may be identified as having a similar depth. However, according to embodiments, any edge-aware filtering may be utilized.

At 325, the flow chart continues with an occlusion handling phase. In one or more embodiments, one object may be occluded by another. For example, referring back to FIG. 2, one camera may capture two objects, while the other camera may only capture the closer object because the far object is occluded by the close object. An occluded object may cause errors when determining disparity because correspondence errors may arise. In one or more embodiments, the second image may be warped using the computed disparity. Then, the warped image may be compared against the reference image, such as image A 230A, to determine a residual image. That difference image may be inversely warped against the computed disparity to determine a residual image. The residual image may be filtered out of the computed disparity to obtain an output disparity, according to one or more embodiments. Further, in embodiments, any occlusion handling method may be used. In one or more embodiments, the result of the occlusion handling 325 may be a version of a disparity map. Because the first iteration of the pipeline may utilize a lowest resolution version of the images, the first version of the disparity map may best identify large disparities, but may not identify small disparities, or disparity around areas in which a background shines through a foreground object, such as if the foreground object is partially occluding a background.

The flow chart continues at 330 and a determination is made regarding whether the current number of the image pyramid equals the number of levels. Said another way, a determination is made regarding whether the pipeline has been traversed using each of the number of levels indicated by the Gaussian image pyramid of 305. If the current number does not equal the final number of levels, then the flow chart continues at 335 and the disparity map is upscaled and N is incremented. For example, if the first resolution level image, then N may be incremented from 1 to 2. According to one or more embodiments, the next resolution level of the Gaussian image pyramid may be used when the flow chart returns at 315. Thus, for each level of the Gaussian image pyramid, the disparity map may be refined, utilizing the TV-L1 regularization phase at 315, the edge-aware filtering at 320, and the occlusion handling at 325. Returning to 330, when a determination is made that the pipeline has been utilized for each level of the Gaussian image pyramid, then the disparity map is output at 340. As shown, the disparity map may indicate how objects in the field of view are related based on color. As depicted, the lighter the pixel, the greater the disparity (and, likewise, the closer the object is to the camera). The disparity map may be based on one of the images that is determined to be the reference image, and the other image may be used to help determine disparity. Thus, as shown, the disparity map looks most similar to image A 230A, which may be the determined reference image, but the disparity for each pixel may be calculated utilizing the second image, such as image B 230B, as shown.

Figure 4:
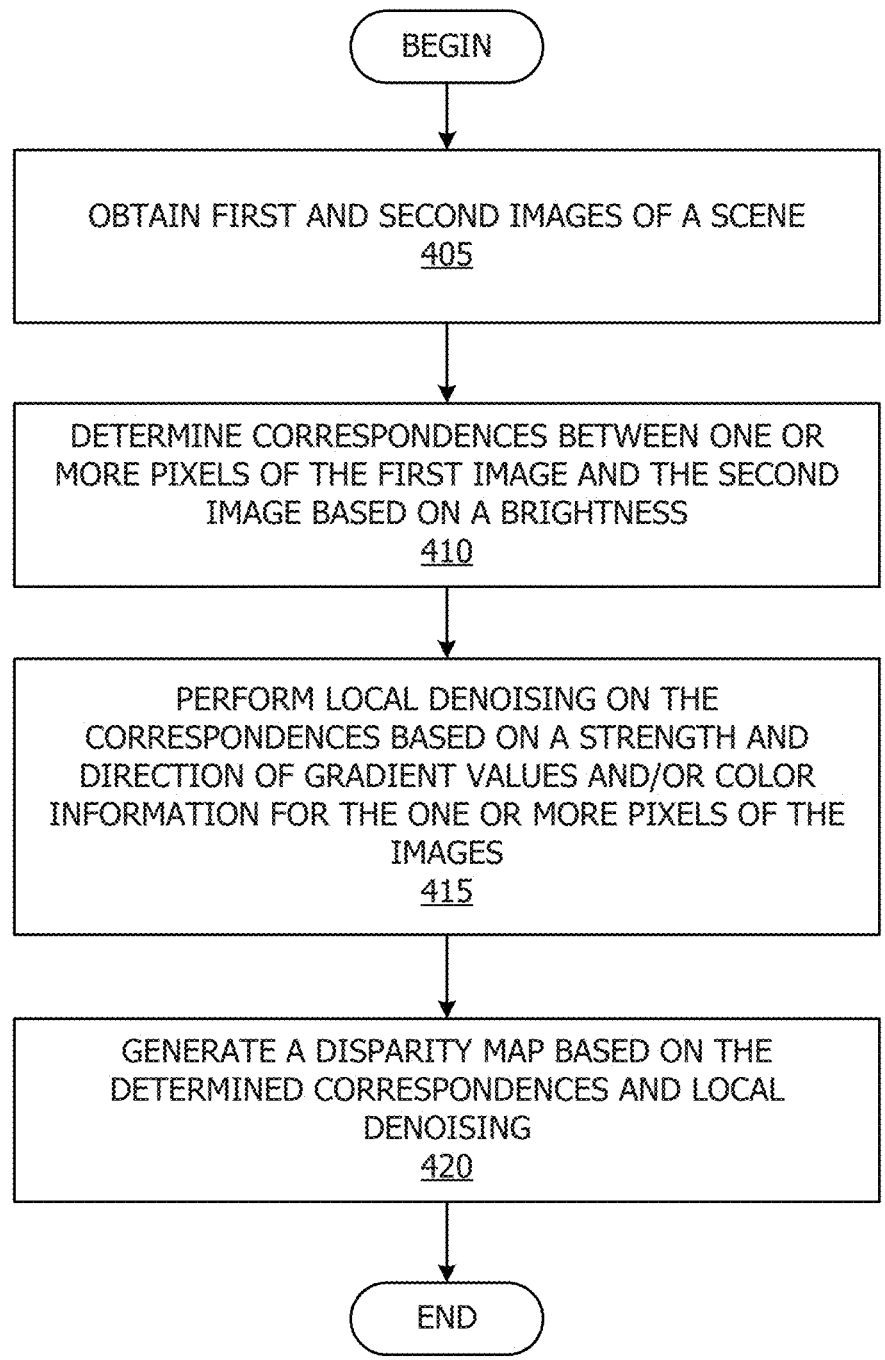
FIG. 4 shows, in flow chart form, an example method of depth determination utilizing total variation L1 regularization, according to one or more embodiments.

FIG. 4 shows, in flow chart form, an example method of depth determination utilizing total variation L1 (TV-L1) regularization, according to one or more embodiments. FIG. 4 depicts a simplified version of a method of determining a disparity map according to one or more embodiments. However, FIG. 5 explains, in greater detail, the use of a TV-L1 regularization phase for determining a disparity map.

The flow chart begins at 405, and first and second images of a scene are obtained. As described above, the first and second image may be captured by a first and second camera capturing an image of a real world environment from different camera poses. Alternatively, the first and second image may be captured by a single camera from two different positions.

The flowchart continues at 410, where correspondences are determined between one or more pixels of the first and second images based on a brightness. In one or more embodiments, pixels that are of a similar brightness may be considered to be at a similar depth. In one or more embodiments, the correspondences may be identified for each pixel. For example, a pixel of a first image may be translated across a second image at the same row to find a correspondence. In one or more embodiments, a cost may be determined as the pixel is translated. The cost may indicate a difference between the pixel of the reference image and the pixel of the second image as the pixel is translated across the image. In one or more embodiments, a warp vector may be determined in order to identify correspondences. The warp vector may be, for example:

$$\text{Vector}(x,y) = \text{Warp}(V(x,y), H)$$

where V(x,y) indicates an initial guess, which may be initialized as zero, but modified over iterations of the Gaussian pyramid level. H may refer to homography, which may be determined as a relationship between the first and second camera, or the pose of the first and second camera at the time the camera images are captured. The cost may identify a difference between the pixels, such as a difference in color or brightness of the pixels. A low cost may indicate a match. In one or more embodiments, the zero normalized cross correlation of the cost may be defined as follows:

$$\text{cost}(x, y) = \frac{1}{(2n+1)^2} \frac{\sum_{q \in N_p}(I_1(q) - \bar{I}_2(p))(I_1(q+v) - \bar{I}_2(p+v))}{\sigma_1 \sigma_2}$$

wherein n refers to the window size, $\bar{I}_2(p)$ and $\bar{I}_2(p+v)$ refer to the average value centered in p, and $\sigma_1$ and $\sigma_2$ refer to the standard deviation of the first/second image centered in p and p+v. The result may be a score that identifies a correlation between one or more pixels in a reference image and the second image.

The flow chart continues at 415, and local denoising is performed on the correspondences based on a strength and direction of gradient values and/or color information for the one or more pixels of the images. According to one or more embodiments, pixels of similar colors may be determined to have similar disparity, which may simplify calculations. In one or more embodiments, the gradient information may be based on color. In one or more embodiments, by utilizing the strength and direction of the gradient, regularization may be performed based on image content. At 420, the flow chart continues as a disparity map is generated based on the determined correspondences and the local denoising. The flow chart ends at 420, and the disparity map is generated based on the determined correspondences and the local denoising. As described above, determining a disparity map may include additional steps. Further, the TV-L1 phase may also include additional steps, as will be described below with respect to FIG. 5.

Figure 5:
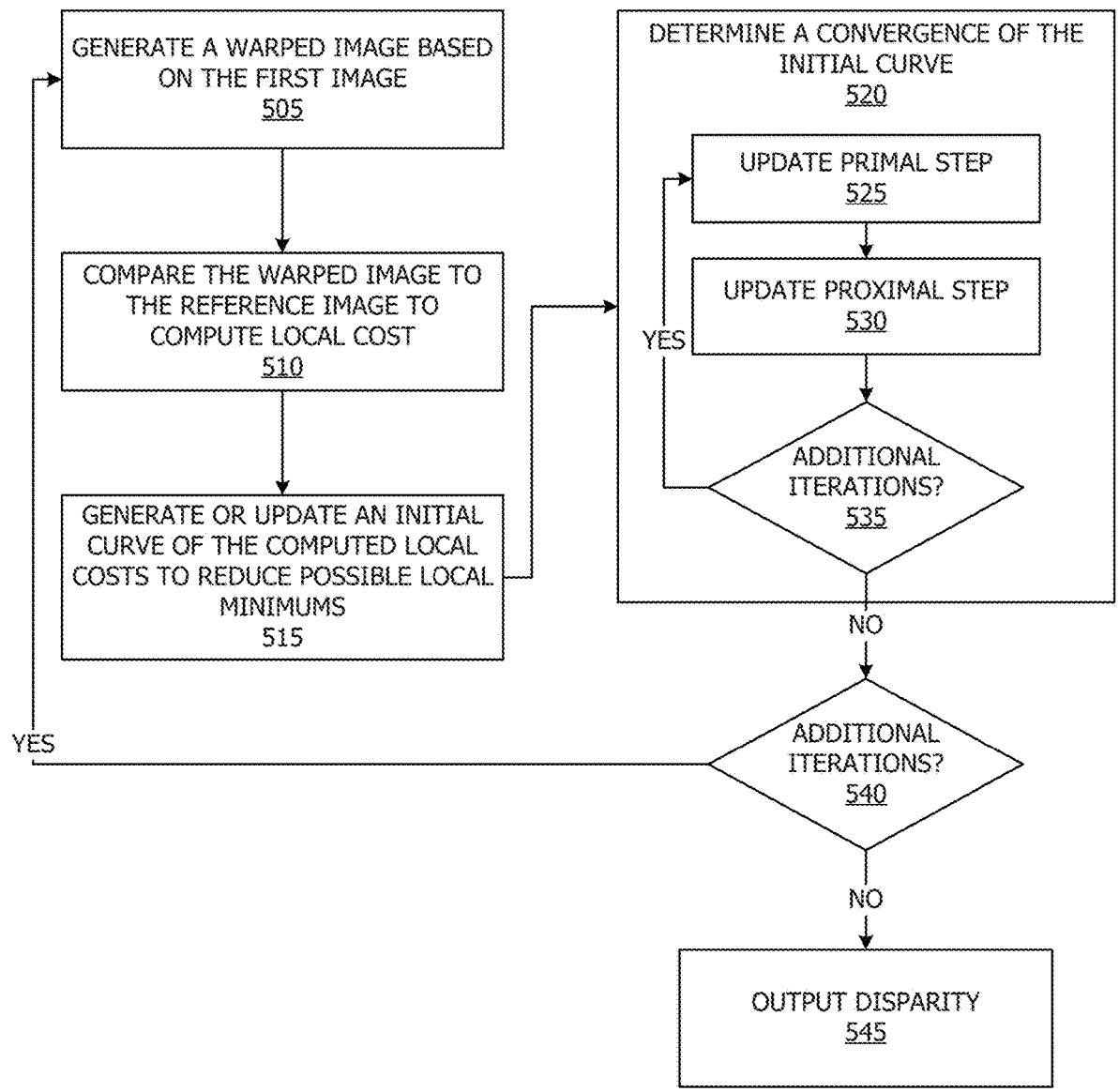
FIG. 5 shows, in flow chart form, an example method of depth determination utilizing total variation L1 regularization, according to one or more embodiments.

FIG. 5 shows, in flow chart form, an example method of depth determination utilizing total variation L1 (TV-L1) regularization, according to one or more embodiments. In general, TV-L1 regularization involves determining a warping function by which a first image may be warped to reach a reference image. Thus, in one or more embodiments, the formula for disparity may be:

$$I_1\left(\begin{bmatrix} x \\ y \end{bmatrix} + \begin{bmatrix} u(x,y) \\ v(x,y) \end{bmatrix}\right) - I_0\left(\begin{bmatrix} x \\ y \end{bmatrix}\right) = 0$$

where $I_0$ and $I_1$ may identify the reference image and the second image, and where u(x,y) and v(x,y) may identify warping functions by which the second image may be warped to reach the reference image. However, some issues may arise that make the formula inconsistent. For example, u(x,y) and v(x,y) cannot always satisfy equation above because of occlusions or mismatches in finding correspondences. As another example, u(x,y) and v(x,y) can be very noisy, e.g., based on noisy captures, mismatches, or the like. Thus, in one or more embodiments, a more accurate formula may be:

$$\min_{u(\Omega),v(\Omega)} \int \left| I_1\left([\Omega] + \begin{bmatrix} u(\Omega) \\ v(\Omega) \end{bmatrix}\right) - I_0([\Omega]) \right| d\Omega + \int |\nabla u(\Omega)| + |\nabla v(\Omega)| d\Omega$$

in which $\Omega$ is the pixel coordinates in image $I_0$ and $I_1$ and $\nabla$ is the gradient of, in this case, u and v. In one or more embodiments, minimizing the gradient of u and v may reduce noise. According to one or more embodiments, minimizing the gradient of u and v in order to attempt to reduce noise assumes that neighborhood flow vectors are similar to a local flow vector.

In one or more embodiments, although the above-referenced more accurate formula may be more accurate, the formula may be more difficult and expensive to compute, for example because of the absolute values. Thus, in one or more embodiments, the absolute values may be approximated by focusing on the convergence rates of the variables, e.g., based on an iterative approach.

The flow chart begins at 505, and a warped image is generated based on the first image. As described above, the warped image may be the second image, and the warped image may be based on the reference image. As described above, the image may be warped in such a manner as to translate a pixel in the warped image across the reference image. At 510, the flow chart continues, and the warped image is compared to the reference image to compute local cost. The local cost may be determined in a number of ways, such as those described above. In one or more embodiments, the local cost may indicate how likely the pixels are to be a match. The cost determination may be performed iteratively, e.g., as a pixel of the second image is translated across the reference image.

Figure 6:
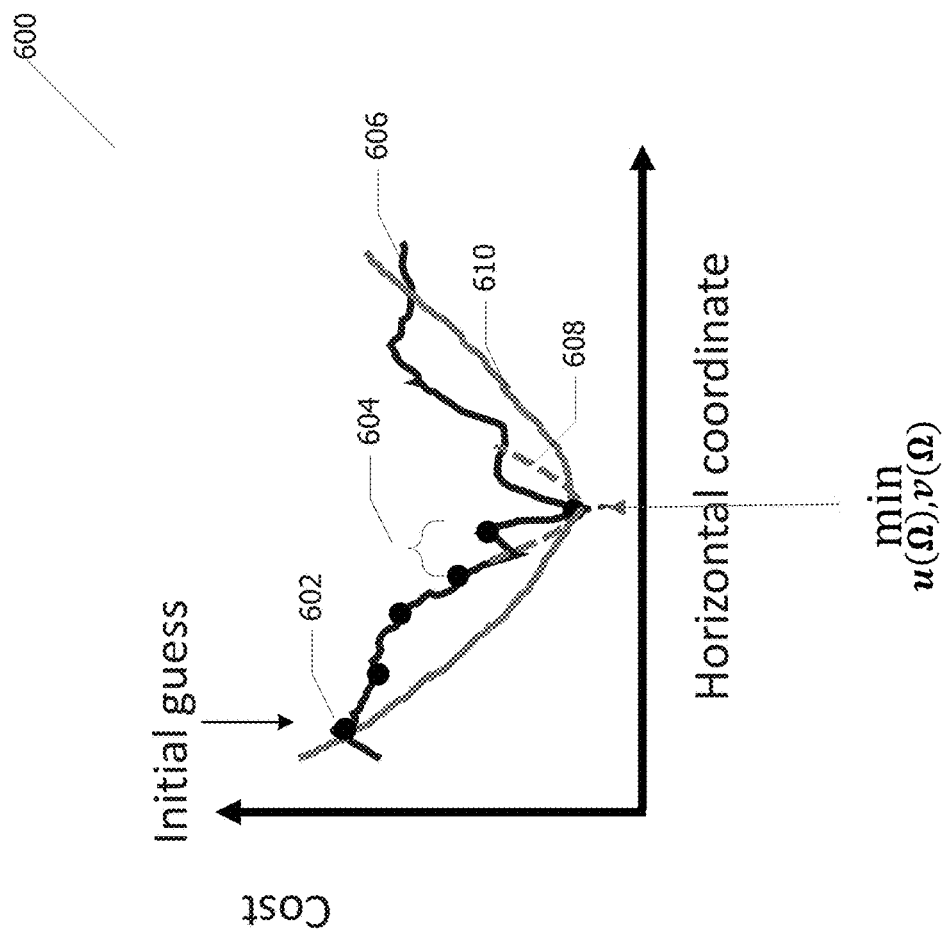
FIG. 6 shows a diagram indicating a cost curve for determining disparity in accordance with one or more embodiments.

The flow chart continues at 515, and an initial curve of the computed local costs (e.g., based on the iterative cost calculations determined in 510) is generated or updated in an attempt to reduce possible local minimums. According to one or more embodiments, the costs for each guess as the pixels is traversed across the reference image may form a jagged curve-type shape. An example is shown in FIG. 6 at 606. Turning to FIG. 6, a cost chart 600 is depicted. The initial curve is shown at 608. In one or more embodiments, a quadratic fit is used to determine the initial curve. For example, the following formula may be used to determine the fit of the curve:

$$R(x,y) = C_{\nabla neighbors}(x,y) - (C_{Hessian}(x,y) \cdot V(x,y) - \partial)$$

where $\partial$ is an offset constant. R may be defined as a linear approximation at the disparity V, where C stands for the first order of the cost and the Hessian is used for the second order. According to some embodiments, the term $C_{\nabla neighbors}(x,y)$ may be defined as being equal to:

$$\frac{\text{Cost}_{v(x-1,y)} - \text{Cost}_{v(x+1,y)}}{2},$$

in other words, the average of the cost of the center pixel's two immediate neighboring pixels, $\text{Cost}_{v(x-1,y)}$ and $\text{Cost}_{v(x+1,y)}$. According to some embodiments, the term $C_{Hessian}(x,y)$ may be defined as being equal to: $\text{Cost}_{v(x-1,y)} + \text{Cost}_{v(x+1,y)} - \text{Cost}_{v(x,y)}$, in other words, the sum of the cost of the center pixel's two immediate neighboring pixels minus the cost of the center pixel.

At 520, a convergence is determined for the initial curve. In one or more embodiments, determining the convergence may involve using a dual space to compute a projection, which may introduce another curve 610 of FIG. 6. The two variables may include V(x,y), which may be a primal variable, and pV(x,y), which may be a proximal variable. The two variables may be initialized as zero for an iteration using the lowest resolution version of the image in the Gaussian image pyramid, and inherited from previous iterations thereafter. By stepping through the curve beginning at an initial guess 602, and at a particular interval 604, a convergence may be found more quickly, but a minimum may be missed. Thus, the interval 604 at which the chart is stepped through may balance a faster result with a more accurate result. According to one or more embodiments, determining correspondences and updating and initial cure may be part of a data term of the TV-L1 phase. In one or more embodiments the data term may be expressed as follows:

$$\int \left| I_1\left([\Omega] + \begin{bmatrix} u(\Omega) \\ v(\Omega) \end{bmatrix}\right) - I_0([\Omega]) \right| d\Omega$$

in which Ω is the pixel coordinates in image $I_0$ and $I_1$, and u and v are related a warping function.

In one or more embodiments, determining a convergence of the initial curve may include updating a primal step 525 and updating a proximal step 530. In one or more embodiments, determining the convergence of the initial term may be considered a regularization term in the TV-L1 phase. In one or more embodiments, the regularization term may be expressed as follows:

$$\int |\nabla u(\Omega)| + |\nabla v(\Omega)| d\Omega$$

where ∇ is the gradient of, in this case, u and v. As described above, in one or more embodiments, the goal is to minimize the gradient of u and v to reduce noise. In one or more embodiments, the regularization term also helps to deal with ambiguities.

At 525, the primal step is updated. In one or more embodiments, updating the primal step includes updating a primal step may be expressed as follows:

$$V_{new}(x, y) = \frac{V(x, y) - \lambda \cdot \tau \cdot R(x, y)}{1 + \lambda \cdot \tau \cdot C_{Hessian}(x, y)}$$

where τ controls the step sizes per iteration (i.e., 604 of FIG. 6) and where λ controls bias towards de-noised curve (i.e., 606 of FIG. 6). in some embodiments, the primal may be updated in a partial fashion, e.g., following a checkerboard pattern, wherein the process may only update the primal variable associated with the even-numbered pixels across a given row in an even-numbered iteration of the loop, and only update the primal variable of the odd-numbered pixels across the row in an odd-numbered iteration of the loop (imagine, e.g., applying the primal update to only the red squares of a checkerboard in one iteration and then applying the primal update to only the black squares on the next iteration). In one or more embodiments, updating the primal using a checkerboard pattern may assist in the convergence rate because fewer iterations may be required to solve the minimization problem. In addition, updating the primal using a checkerboard pattern may help to leave local minimum, which can be translated as a less noisy solution.

At 530, the proximal step is updated. In one or more embodiments, updating the proximal step may include updating the vector determined during the primal step at 525. In one or more embodiments, updating the proximal may be expressed as follows:

$$pV(x, y) = pV(x, y) + \frac{\sigma \cdot \text{Regularize}(V(x, y), R_a, R_b, R_c, R_d)}{1 + 0.01 \sigma}$$

where σ is the step size for the proximal, the Regularize expression is represented as: Regularize $(x,y)=R_a(x,y)-(V(x,y)-V(x+1,y)+R_b(x,y)-(V(x,y)-V(x,y+1)+R_c(x,y)-(V(x,y)-V(x+1,y)+R_d (x,y)-(V(x,y)-V(x,y+1)$, and the individual Regularization terms may be represented as: $R_a=w\cdot I_x^2+I_y^2$; $R_b=R_c=w\cdot I_x\cdot I_y-I_x\cdot I_y$; and $R_d=w\cdot I_y^2+I_x^2$, wherein $I_x$ is the gradient in an x-direction, evaluated as $I_x=I\otimes[-1\ 0\ 1]$, $I_y$ is the gradient in a y-direction, evaluated as $I_y=I\otimes[-1\ 0\ 1]^T$, and w is a weighting term. In one or more embodiments, the convergence may be determined over a number of iterations. In one or more embodiments, the result of the updated primal and proximal may allow for the determination of the updated curve (i.e., 608 in FIG. 6), which may provide a more accurate determination for the minimum cost. Because the primal and proximal step occur iteratively, a determination is made at 535 regarding whether the determined number of iterations have completed. If not, then the flow chart continues to 525 and the primal step is again updated, based on output from the previous proximal step. If, at 535, a determination is made that the total number of iterations has completed, then the flow chart continues at 540. At 540, a determination is made regarding whether each level of the Gaussian image pyramid has been processed. In one or more embodiment, the determination corresponds to the determination 330 of FIG. 3. Thus, additional phases of the pipeline may need to be completed between 535 and 540. If at 540, it is determined that there are no additional iterations, then at 545, the disparity information is output. In one or more embodiments, the output may be the disparity map, such as at 340 of FIG. 3.

Figure 7:
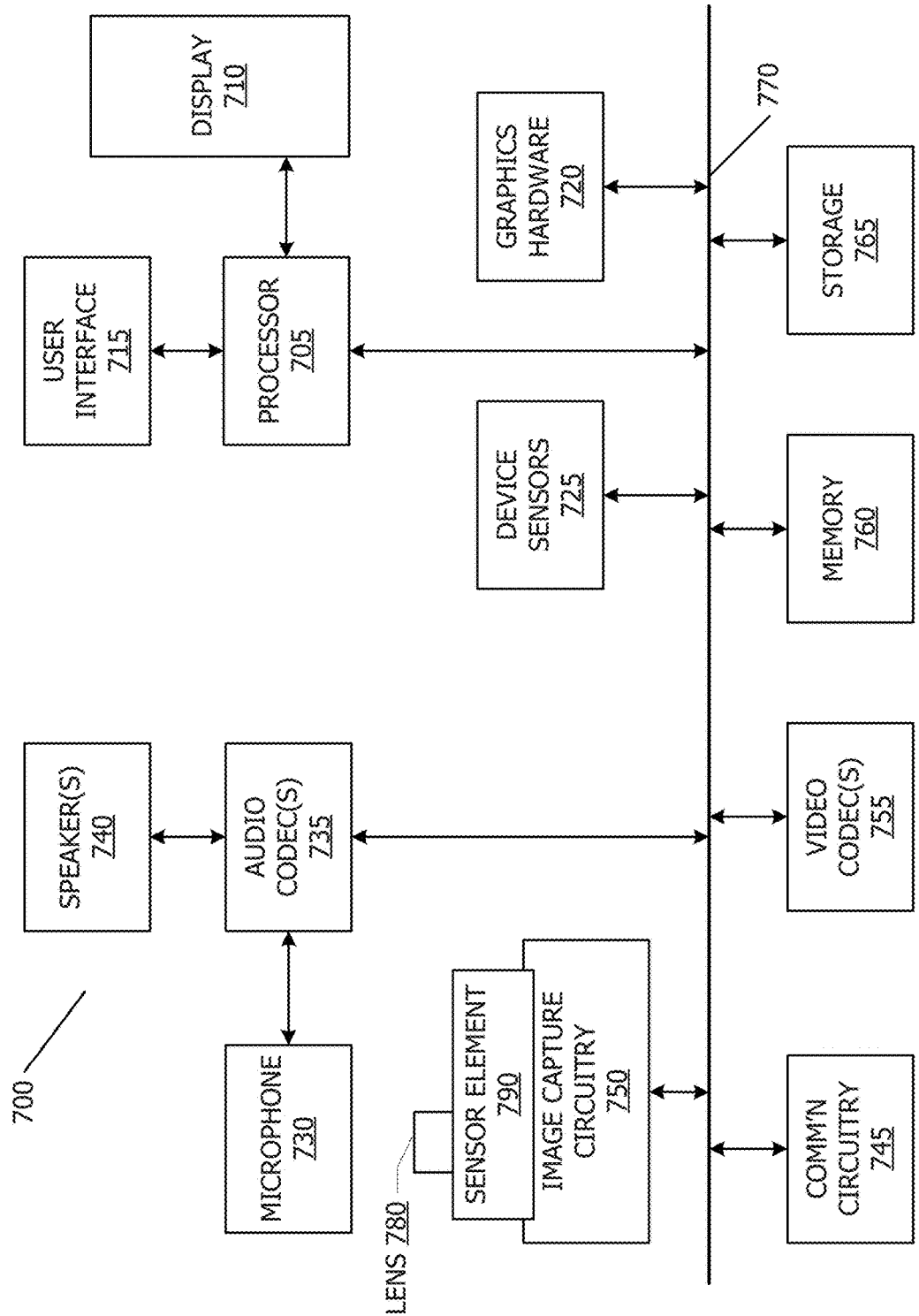
FIG. 7 shows, in block diagram form, a simplified multifunctional device according to one or more embodiments.

Referring now to FIG. 7, a simplified functional block diagram of illustrative multifunction device 700 is shown according to one embodiment. Multifunction device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuitry 750 (e.g., including camera system 100) video codec(s) 755 (e.g., in support of image capture unit 750), memory 760, storage device 765, and communications bus 770. Multifunction device 700 may be, for example, a digital camera or a personal electronic device such as a personal digital assistant (PDA), personal music player, mobile telephone, or a tablet computer.

Processor 705 may execute instructions necessary to carry out or control the operation of many functions performed by multifunction device 700 (e.g., such as the generation and/or processing of images and single and multi-camera calibration as disclosed herein). Processor 705 may, for instance, drive display 710 and receive user input from user interface 715. User interface 715 may allow a user to interact with multifunction device 700. For example, user interface 715 can take a variety of forms, such as a button, keypad, dial, a click wheel, keyboard, display screen and/or a touch screen. Processor 705 may also, for example, be a system-on-chip such as those found in mobile devices and include a dedicated graphics processing unit (GPU). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include two (or more) lens assemblies 780, where each lens assembly may have a separate focal length or other distinguishing characteristics. For example, one lens assembly may have a short focal length relative to the focal length of the other lens assembly. Each lens assembly may have a separate associated sensor element 790. Alternatively, two or more lens assemblies may share a common sensor element. Image capture circuitry 750 may capture still and/or video images. Output from image capture circuitry 750 may be processed, at least in part, by video codec(s) 755 and/or processor 705 and/or graphics hardware 720, and/or a dedicated image processing unit or pipeline incorporated within image capture circuitry 750. Images so captured may be stored in memory 760 and/or storage 765.

Memory 760 may include one or more different types of media used by processor 705 and graphics hardware 720 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or code organized into one or more modules and written in any desired computer programming language. When executed by, for example, processor 705 such computer program code may implement one or more of the methods described herein.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium for determining disparity, comprising computer readable code, executable by one or more processors, to:
   obtain a first image of a scene and a second image of the scene;
   determine correspondences between one or more pixels of the first image and one or more pixels of the second image;
   perform local denoising on the correspondences based at least on a strength and direction of gradient values for the one or more pixels of the first image and the one or more pixels of the second image to create denoised correspondences;
   perform edge aware filtering of the one or more pixels of the first image and the one or more pixels of the second image to create an edge aware filtering output; and
   generate a disparity map based on the determined correspondences, denoised correspondences, and the edge aware filtering output.

2. The non-transitory computer readable medium of claim 1, further comprising computer readable code to:
   determine that an object in the scene appears in the first image and does not appear in the second image;
   generate a warped image based on the first image of the scene;
   compare the second image to the warped image to obtain a difference image; and
   inverse warp the difference image to obtain a residual image and wherein the computer readable code to generate the disparity map further includes computer readable code to filter.

3. The non-transitory computer readable medium of claim 1, wherein the computer readable code to determine correspondences further comprises computer readable code to:
   determine correspondences between the one or more pixels of the first image and the one or more pixels of the second image based on a brightness of the one or more pixels of the first image and a brightness of the one or more pixels of the second image.

4. The non-transitory computer readable medium of claim 1, wherein the computer readable code to perform local denoising further comprises computer readable code to utilize color information for the one or more pixels of the first image and the one or more pixels of the second image.

5. The non-transitory computer readable medium of claim 4, further comprising computer readable code to:
   compare a first set of pixels of a first image to plurality of sets of pixels of the second image;
   scoring a correlation between the first set of pixels and each of the plurality of sets of pixels of the second image based on the comparing; and
   determine a convergence of the scoring.

6. The non-transitory computer readable medium of claim 1, further comprising computer readable code to repeat the computer readable code to determine, perform, and generate using a second version of the first image and a second version of the second image at a second resolution.

7. The non-transitory computer readable medium of claim 1, wherein the first image is captured from a first camera pose and wherein the second image is captured from a second camera pose.

8. A system for determining disparity, comprising:
   one or more processors; and
   one or more memories coupled to the one or more processors and comprising computer readable code executable by the one or more processors to:
   obtain a first image of a scene and a second image of the scene;
   determine correspondences between one or more pixels of the first image and one or more pixels of the second image;
   perform local denoising on the correspondences based at least on a strength and direction of gradient values for the one or more pixels of the first image and the one or more pixels of the second image to create denoised correspondences;
   perform edge aware filtering of the one or more pixels of the first image and the one or more pixels of the second image to create an edge aware filtering output; and
   generate a disparity map based on the determined correspondences, denoised correspondences, and the edge aware filtering output.

9. The system of claim 8, further comprising computer readable code to:
- determine that an object in the scene appears in the first image and does not appear in the second image;
- generate a warped image based on the first image of the scene;
- compare the second image to the warped image to obtain a difference image; and
- inverse warp the difference image to obtain a residual image and wherein the computer readable code to generate the disparity map further includes computer readable code to filter the residual image.

10. The system of claim 8, wherein the computer readable code to determine correspondences further comprises computer readable code to:
- determine correspondences between the one or more pixels of the first image and the one or more pixels of the second image based on a brightness of the one or more pixels of the first image and a brightness of the one or more pixels of the second image.

11. The system of claim 8, wherein the computer readable code to perform local denoising further comprises computer readable code to utilize color information for the one or more pixels of the first image and the one or more pixels of the second image.

12. The system of claim 11, further comprising computer readable code to:
- compare a first set of pixels of a first image to plurality of sets of pixels of the second image;
- score a correlation between the first set of pixels and each of the plurality of sets of pixels of the second image based on the comparing; and
- determine a convergence of the scoring.

13. The system of claim 8, further comprising computer readable code to repeat the computer readable code to determine, perform, and generate using a second version of the first image and a second version of the second image at a second resolution.

14. The system of claim 8, wherein the first image is captured from a first camera pose and wherein the second image is captured from a second camera pose.

15. A method for determining disparity, comprising:
- obtaining a first image of a scene and a second image of the scene;
- determining correspondences between one or more pixels of the first image and one or more pixels of the second image;
- performing local denoising on the correspondences based at least on a strength and direction of gradient values for the one or more pixels of the first image and the one or more pixels of the second image to create denoised correspondences;
- performing edge aware filtering of the one or more pixels of the first image and the one or more pixels of the second image to create an edge aware filtering output; and
- generating a disparity map based on the determined correspondences, denoised correspondences, and the edge aware filtering output.

16. The method of claim 15, further comprising:
- determining that an object in the scene appears in the first image and does not appear in the second image;
- generating a warped image based on the first image of the scene;
- comparing the second image to the warped image to obtain a difference image; and
- inverse warping the difference image to obtain a residual image and wherein generating the disparity map includes filtering the residual image.

17. The method of claim 15, wherein determining correspondences further comprises:
- determining correspondences between the one or more pixels of the first image and the one or more pixels of the second image based on a brightness of the one or more pixels of the first image and a brightness of the one or more pixels of the second image.

18. The method of claim 15, wherein performing local denoising further comprises utilizing color information for the one or more pixels of the first image and the one or more pixels of the second image.

19. The method of claim 15, further comprising:
- comparing a first set of pixels of a first image to plurality of sets of pixels of the second image;
- scoring a correlation between the first set of pixels and each of the plurality of sets of pixels of the second image based on the comparing; and
- determining a convergence of the scoring.

20. The method of claim 15, further comprising repeating the computer readable code to determine, perform, and generate using a second version of the first image and a second version of the second image at a second resolution.

* * * * *